March 10, 1942.  W. BROWN  2,275,503
PROCESS FOR MAKING COMPOSITE METAL ARTICLES AND APPARATUS THEREFOR
Filed Dec. 24, 1935
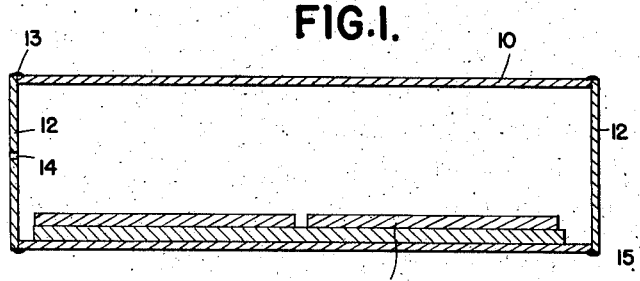
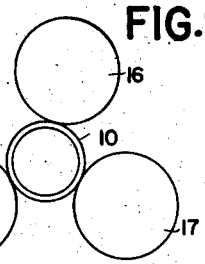
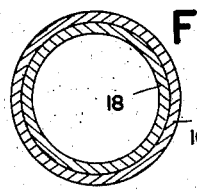
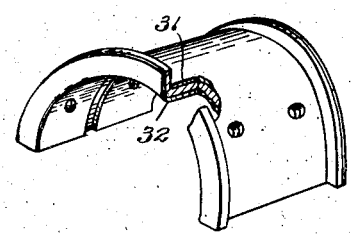
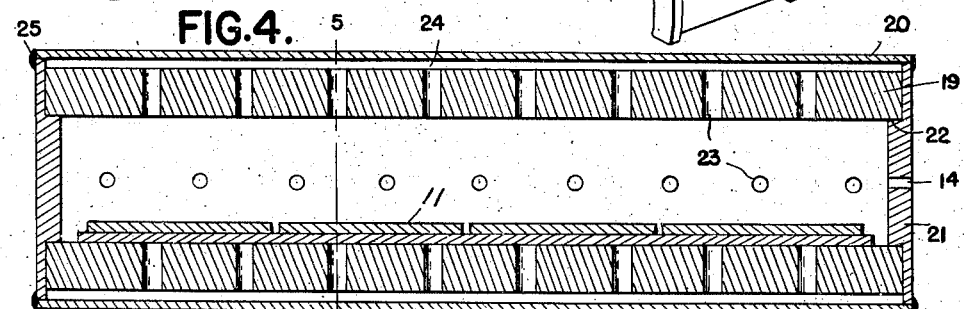
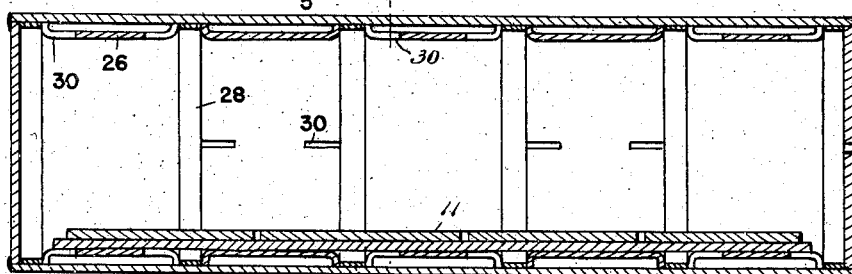
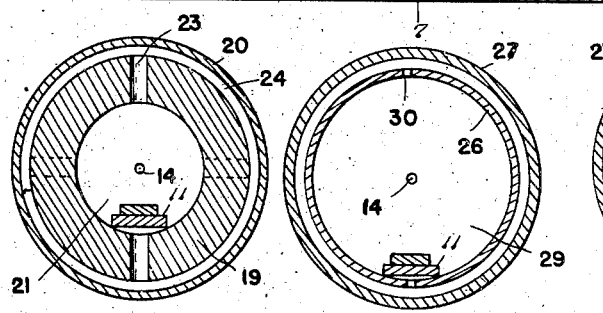
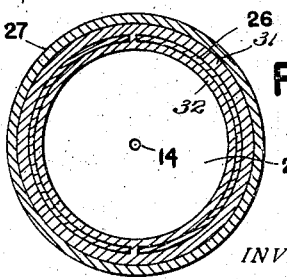
INVENTOR
WALTER BROWN
BY Whittemore Hulbert Whittemore
& Belknap ATTORNEYS Patented Mar. 10, 1942

2,275,503

UNITED STATES PATENT OFFICE 2,275,503

PROCESS FOR MAKING COMPOSITE METAL ARTICLES AND APPARATUS THEREFOR

Walter Brown, Detroit, Mich.

Application December 24, 1935, Serial No. 56,045

17 Claims. (Cl. 22—65)

The invention relates to the manufacture of composite metal articles composed of two different metals or alloys, integrally and continuously bonded together. The process of my invention is an improvement on the process disclosed in my Patent No. 1,923,075, issued August 22, 1933. The products of my invention are improvements on the products disclosed in my Patent No. 2,033,814, issued March 10, 1936.

One of the objects of the invention is to provide an improved process for producing composite articles on a large scale production basis with reduced manufacturing costs and uniform metallurgical characteristics.

Another object is to provide a process applicable to the lining of tubes of considerable length without distortion of the tubes.

Another object is to provide a process adaptable for the formation of a bonded coating on the outer periphery of an annular article or upon both the outer and inner peripheral surfaces thereof.

A further object is to provide a method for maintaining concentricity between the shell and the lined surfaces thereof, and still further to provide a lining so accurately cast that it requires the removal of very little metal by grinding or other operations to obtain a finished true circular surface free from all surface defects.

With the above and other objects in view, my invention can best be understood by reference to the drawings in which—

Fig. 1 is a longitudinal section through a tube in which a lining is to be formed showing the method of inserting the lining material and preparing the tube for the lining process;

Fig. 2 is a diagrammatic view showing the method of spinning the tube of Fig. 1;

Fig. 3 is a cross section through the tube of Fig. 1 after spinning;

Fig. 4 is a longitudinal section through a device for lining the outer surface of a tubular article;

Fig. 5 is a cross section on the line 5—5 of Fig. 4;

Fig. 6 is a longitudinal section through a device for lining both the outer and inner surfaces of a steel shell to form a bearing useful for internal combustion engines;

Fig. 7 is a cross section on the line 7—7, Fig. 6;

Fig. 8 is a similar cross section after the lining metal is in place;

Fig. 9 is a view of a finished half bearing made in the device of Fig. 6.

In my prior patents above referred to, it was shown that an integral and continuous bond may be obtained between a tube and a molten lining metal, by inserting the metal in a solid state within the tube to be lined, then hermetically sealing the ends of the tube, leaving only a small vent, heating the tube to a temperature to melt the lining material, and rotating the heated tube to uniformly distribute the molten lining metal during the solidification of the same. I have now found that by improving the process as outlined in my prior patents, I am able to make lined tubing in long lengths. I am also able to predetermine with great accuracy the exact thickness of the lining and to maintain the same concentric with the outer surface of the tube. In order to accomplish this purpose, I carry out the spinning of the tubing in a machine which preferably centers the tube by means of a plurality of rollers engaging the periphery of the tube. This has the effect of supporting the tube when in the heated condition, to prevent warping and in fact to straighten the tube which may have become warped during the heating operation.

As shown in Fig. 1, 10 is the tube which it is desired to line. 11 represents the metal which is to form the lining. This metal may be introduced either as pieces of an alloy of the composition desired in the lining, or the desired proportions of virgin metals may be introduced, such that when they are melted together, the desired composition will be obtained. The tube 10 is closed by end plates 12 which preferably are welded to the tube as indicated at 13. One of the end plates has a small vent hole 14. After the tube 10 has been hermetically sealed, it is placed in a furnace adapted to bring the temperature of the tube and its contents to the temperature required to melt the metals forming the lining material. The tube is then withdrawn from the furnace and placed in a spinning machine which is diagrammatically illustrated in Fig. 2. In this machine there are three rolls 15, 16 and 17. The roll 16, which is above the tube 10, is set off-center with respect to the tube 10, which insures that a true circular shape will be maintained during the spinning operation. One or more of the rolls is positively rotated by suitable means. During the spinning of the tube it is usual to cause more rapid cooling by projecting a series of streams of water on to the spinning tube.

When the spinning is completed, the tube is removed from the spinning machine and the end plates 12 are removed from the tube, thus leaving composite metal tubing as illustrated in Fig. 3, where 10 is the outer layer and 18 is the inner lining bonded thereto.

My invention also contemplates the formation of a metal lining on the outer periphery of a tubular article. To accomplish this purpose, I place the tubular article which is to be lined on the periphery within a larger tubular container. This is illustrated in Figs. 4 and 5, in which 19 is the tubular article to be lined and 20 is the outer casing. In order to keep the tubes concentric with one another, I make end plates 21 to fit the outer tube with a groove concentric to the outside to receive the end of the inner tube. This groove in the end plate forms the center cylindrical portion 22 which engages the inner surface of the tube 19. It is then necessary to provide slots or holes in the tube 19 so that the molten metal may flow to the outer surface of the container by centrifugal action. These holes are illustrated at 23 and as will be observed, communicate with the annular space 24 between the tubes. After the lining metal 11 is put into the inside of the tube the end plates are welded in position as indicated at 25 and the whole assembly is put into a furnace and heated to a temperature slightly above the melting temperature of the lining metal. The tube is then removed from the furnace and rotated at a high rate of speed, causing the molten metal on the inside to pass out through the holes or slots and completely fill the space between the two tubes. The rotation is continued until the lining metal solidifies, thus bonding both tubes and the lining metal into a solid mass. After the integrated assembly is removed from the spinning machine the end plates are removed and the outer tube 20 is removed by machining or grinding, thus leaving the tubular article with the lining metal on the outer periphery thereof. In case it is not desired to have perforations in the tube 19, it may still be possible to coat the outer surface thereof if the tube is not too long, by allowing sufficient clearance between the end plates and the ends of the tube so that the metal may flow around the ends of the tube into the space 24 by centrifugal action.

By predetermining the amount of metal introduced into the tube in the solid state, the inside of the tube 19 may be left free from any lining metal or may be lined to a sufficient depth as desired. It should also be pointed out that in some instances the outer shell 20 may be coated with a composition prior to its assembly, such that the molten metal is not integrally bonded to the outer casing. In such instances the outer tube 20 may be removed from the finished article by means other than machining away the metal. In carrying out the process illustrated in Fig. 4 the outer casing 20 will be made of a thickness sufficient to withstand the spinning operation at the temperature used, but it will not be made any thicker than necessary because of the necessity of removing the metal in the subsequent machine operations.

A further modification of my invention is useful for the lining of small annular articles, such as the bearings which are used in internal combustion engines. Such bearings are desirably made with a steel insert to give strength, while having both the outer and inner surfaces thereof of leaded bronze or other suitable alloy for bearing purposes. As illustrated in Figs. 6 and 7, I place a series of annular steel inserts 26 in a tubular outer casing 27, providing spacer rings 28 intermediate the steel inserts. The spacer rings may be made of thin steel, graphite, mica or any other suitable material. The steel inserts are provided with slots 30 at diametrically opposite points. The outer casing 27 is loaded with alternate steel inserts and spacer rings until it is filled, and the desired amount of lining metal is then placed on the inside of the steel 11 inserts. The end plates 29 are welded to the outer casing as previously described, thus hermetically sealing the device except for the vent hole 14. The entire sealed device is then heated in a furnace and spun as previously described, causing the bronze to entirely surround the steel inserts, becoming integrally bonded to the same and to the outer casing 27 as illustrated in Figure 8 where 31 represents the bronze layer on the outside surface of the steel shell 26 and 32 represents the bronze layer on the inside of the steel shell. After the tube has cooled and is removed from the spinning machine, the entire mass may then be subjected to a series of machining operations whereby the outer casing 27 is machined away, as is also the spacer rings and the excess bronze, leaving the finished article as illustrated in Fig. 9.

My process is particularly applicable for forming composite articles of metals or alloys of relatively high melting point, that is, on the order of 1000° F. or above. One example is an article having a steel core and a bronze lining metal. Another example is an article having a steel core and a lining of certain cobalt-chromium alloys of the type known as stellite. My invention also contemplates a steel tube with a lining of a special steel alloy having other alloy ingredients which are capable of producing extreme hardness. These examples are given only by way of illustration, and it is to be understood that various other combinations can be made while coming within the scope of the invention.

What I claim as my invention is:

1. The method of manufacturing composite tubular articles comprising inserting within a carrier tube a series of annular articles, inserting within said tube, metal having a melting point lower than the melting point of said annular articles, sealing the ends of said tube except for a small vent, heating said sealed tube to a temperature above the melting point of said contained metal and spinning said carrier tube to distribute the molten metal on the inside and outside surfaces of said annular articles and cooling said carrier tube while it is spinning.

2. The method of manufacturing composite tubular articles comprising placing a metallic tube within a metallic carrier tube of greater diameter to form an annular space between said tubes, inserting within said carrier tube solid metal having a melting point below that of said metallic tube and metallic carrier, sealing the ends of said carrier tube except for a small vent, heating said carrier tube to a temperature sufficient to melt said solid metal contained therein, spinning said heated carrier tube about a substantially horizontal axis thereby centrifugally distributing the molten metal between said inner and outer tubes, cooling said carrier tube during the rotation thereby solidifying the molten metal and uniting the inner tube and carrier tube into an integral mass and machining the carrier tube thereby exposing the outer layer of solidified metal.

3. The method of manufacturing composite bearings having outwardly extending flanges and having a bearing material on the inside and outside annular surfaces thereof, comprising inserting within a metallic carrier tube a plurality of outwardly flanged annular metallic shells, the inside diameter of said carrier tube being of a diameter to concentrically support said shells within said carrier, placing spaces of predetermined length between each of said shells, inserting within said carrier tube a predetermined quantity of solid metal such as to form an inner lining of predetermined thickness, sealing the ends of said carrier tube except for a small vent, heating said carrier tube to a temperature sufficient to melt said solid metal, spinning said heated carrier tube about a substantially horizontal axis to centrifugally distribute the molten metal to the inner and outer sides of said shells, cooling said carrier tube during the rotation thereby solidifying the molten metal and uniting the shells, spacers, lining metal and carrier tube into an integral mass and machining said integral mass to obtain therefrom a plurality of composite bearings having said lining metal on the inner and outer surfaces thereof.

4. The method of integrally bonding metal bodies exteriorly with a layer of another metal which comprises surrounding the body with a metal shell spaced outwardly therefrom the desired thickness of the external layer, providing a closed chamber within the assembly connecting with the circumferential space within the shell, placing in said chamber the desired quantity of metal for the external layer, substantially sealing the ends of the chamber, heating the assembly to melt the metal in said chamber, spinning the assembly about its axis to force the molten metal from said chamber to fill the circumferential space within the shell, until the metal has solidified and formed an integral bond with the outer surface of said body, and thereafter destructively stripping or machining the shell from the exterior layer.

5. In a method for forming a wear resisting metal facing on the outer surface of rods, tubes and like bodies, enclosing the outer surface of the body with a readily machinable metal shell, whereby an annular space is formed between the outer surface of the body and the shell, causing a fused metal alloy to be urged into said space by centrifugal force, and then machining away the metal shell to expose the outer surface of the metal alloy, when the alloy has hardened.

6. In a method for forming wear resisting metal facings on the outer surfaces of rods, tubes and like bodies, enclosing the outer surface of the body with a readily machinable metal shell, whereby an enclosed annular space is formed between the shell and the outer surface of the body, providing a space in the assembly thus formed to receive a charge of metal alloy, heating the assembly and the charge to fuse the metal alloy, spinning the assembly about its axis to cause the alloy to be urged into said annular space under centrifugal pressure, and then machining away the outer shell, when the assembly has cooled.

7. In a method for forming wear resisting metal facings on the outer surfaces of metallic bodies by the use of an alloy having a fusion temperature lower than the fusion temperature of said body, enclosing the outer surface of said body with a readily machinable metal shell having a fusion temperature higher than the fusion temperature of said alloy whereby an annular space is formed between said shell and the outer surface of said body corresponding generally to the dimension of the layer of facing desired upon said body, providing an additional enclosed space in the assembly to receive a charge of the metal alloy, heating the assembly and a charge of metal alloy in said space to fuse the alloy, spinning the assembly about its axis to cause the fused alloy to be urged into said annular space under centrifugal pressure and then machining away said outer shell after the assembly has cooled.

8. The method of covering hollow and solid cylindrical articles of iron and steel with an alloy which comprises enclosing said articles in a shell having an internal diameter greater than the outer diameter of said articles and with the axes of shell and article coincident, introducing alloy within the shell, providing closures for both ends of said shell, heating the assembly to the melting point of the alloy, spinning the assembly on its axis and flowing the metal alloy the annular space between said article and said shell under the centrifugal action of said spinning, cooling the assembly while spinning, and exposing the alloy covering by removing the shell from the cooled assembly.

9. The method of covering a metallic body with an outer layer of another metal which comprises enclosing the metallic body in a shell having an internal diameter greater than the outer diameter of said body and with the axes of said shell and body coincident, introducing within said shell a metal having a melting point above 1000° F., substantially closing both ends of said shell, heating the assembly of said shell and body to fuse said metal, spinning said assembly on its axis to force the molten metal into the annular space between said body and said shell by centrifugal action, cooling the assembly while spinning and exposing the said metal having a melting point above 1000° F. by removing the shell from the cooled assembly.

10. The method of manufacturing composite articles having an outer metallic layer integrally bonded to an inner metallic body, comprising placing a metallic body within a metallic shell of greater diameter to form an annular space of substantially the desired thickness of the external layer, inserting within said shell solid metal having a melting point above 1000° F. but below the melting point of the metallic body and metallic shell, substantially sealing the ends of said shell, heating the assembly of said body and shell to a temperature sufficient to melt said solid metal contained therein, spinning said assembly about its axis to centrifugally distribute the molten metal into said annular space between said body and said shell, continuing said spinning until said molten metal has solidified as an outer metallic layer integrally bonded to the outer surface of said body, and thereafter removing said shell from said outer metallic layer.

11. An assembly for integrally bonding a metal body exteriorly with a layer of another metal which comprises a tubular shell, a metal body supported within said shell and spaced from the inner diameter thereof to form an annular space, and ends secured to said shell forming a closed chamber within said shell, said assembly being provided with a vent restricted in size communicating with the interior at a point radially inward from the periphery to relieve internal pressure during heating and to substantially prevent ingress of external atmosphere and, when said assembly is in a horizontal position, to prevent escape of the molten metal within said closed chamber.

12. An assembly for the bonding of a metallic layer to the outer surface of a body which comprises a tubular shell having the ends thereof substantially closed except for a small vent, a metal body supported within said shell and spaced from the inner diameter thereof to form an annular space communicating with the interior of said metal body, and a charge of solid lining material within said tubular shell, said charge having a melting point below the melting point of said shell whereby upon heating said assembly to melt said charge and then spinning the same about its axis, the lining material is distributed to said annular space and bonded to the outer surface of said metal body.

13. An assembly for the bonding of a metallic layer to the outer surface of an annular article which comprises a tubular shell having the ends thereof substantially closed except for a small vent, a plurality of annular articles arranged end to end within said shell and having portions thereof spaced from the inner diameter of said shell, spacers between adjacent articles and a charge of solid lining material within said annular articles, said charge having a melting point below the melting point of said shell whereby upon heating said assembly to melt said charge and then spinning the same about its axis, the lining material is centrifugally distributed to the space surrounding said annular articles and bonded to the outer surfaces of said articles.

14. The method of covering a metallic body with another metal which comprises enclosing said body in a metallic shell having an internal diameter greater than the outer dimension of said body, providing closures for the ends of said shell to substantially seal the same against ingress of external atmosphere, heating the assembly, spinning the heated assembly with molten metal therein to cause said metal to flow into the space between said body and said shell by the centrifugal force developed by said spinning, cooling the assembly while spinning until the metal has solidified, and exposing the metal covering by removing the shell from the cooled assembly.

15. In a method for covering a metallic body with another metal, the step of centrifugally distributing the molten covering metal to the outer face of said body while retained within a container substantially sealed against ingress of air.

16. The method of forming composite articles which comprises supporting a preformed metallic article spaced inwardly from an outer readily machinable cylindrical metallic shell, spinning the assemblage with molten metal therein thereby forcing said molten metal by centrifugal force into the space between said article and said shell for bonding thereto, and finally destructively stripping the outer shell to expose the outer layer of said bonded metal.

17. The method of forming composite tubular articles which comprises supporting a preformed metallic tube spaced inwardly from an outer readily machinable metallic shell, spinning the assemblage with sufficient molten metal therein to force said molten metal by centrifugal force into the space between said tube and shell leaving a layer of additional molten metal on the inside of said tube, and finally destructively stripping the outer shell to expose the outer layer of said bonded metal.

WALTER BROWN.